United States Patent [19]
Nikander

[11] Patent Number: 6,029,151
[45] Date of Patent: Feb. 22, 2000

[54] METHOD AND SYSTEM FOR PERFORMING ELECTRONIC MONEY TRANSACTIONS

[75] Inventor: Pekka Nikander, Helsinki, Finland

[73] Assignee: Telefonaktiebolaget L M Ericsson, Stockholm, Sweden

[21] Appl. No.: 08/989,927

[22] Filed: Dec. 12, 1997

[30] Foreign Application Priority Data

Dec. 13, 1996 [EP] European Pat. Off. .............. 96660098

[51] Int. Cl.[7] ....................................................... H04L 9/00
[52] U.S. Cl. ................................ 705/39; 705/40; 380/21; 380/24; 380/33
[58] Field of Search .......................... 705/39, 40; 380/21, 380/24, 33

[56] References Cited

U.S. PATENT DOCUMENTS

| | | | |
|---|---|---|---|
| 5,221,838 | 6/1993 | Gutman et al. ........................ | 235/379 |
| 5,311,572 | 5/1994 | Friedes et al. . | |
| 5,455,407 | 10/1995 | Rosen . | |
| 5,590,197 | 12/1996 | Chen et al. ............................... | 380/24 |
| 5,655,008 | 8/1997 | Futch et al. ........................... | 379/91.01 |
| 5,671,280 | 9/1997 | Rosen ..................................... | 380/24 |
| 5,704,046 | 12/1997 | Hogan ..................................... | 705/39 |
| 5,745,886 | 4/1998 | Rosen ..................................... | 705/39 |
| 5,873,072 | 2/1999 | Kight et al. .............................. | 705/40 |
| 5,884,288 | 3/1999 | Chang et al. ............................. | 705/40 |

*Primary Examiner*—Allen R. MacDonald
*Assistant Examiner*—Jagdish Patel
*Attorney, Agent, or Firm*—Darby & Darby

[57] ABSTRACT

The present invention relates to electronic monetary systems in general, and in particular to measures for making their use easier for an average user. The present invention is based on the idea that the use of electronic money is greatly simplified for a non-expert user, if the Internet Service Provider of the user takes care of the payments, and adds corresponding charges on the user's telephone bill. Such functionality requires the intervention of the ISP in the transmissions between a user and a third party, i.e. intercepting the electronic payment requests sent by a merchant. According to the present invention, the ISP uses electronic money on behalf of the user, and charges the payments on the user's telephone bill. The ISP can take care of all technical details necessary for obtaining different forms of electronic money in a centralized manner, and all users of the ISP can use the electronic money obtained by the ISP simply by allowing the ISP to add corresponding charges to their telephone bills. Further, the ISP can obtain all major forms of electronic money, whereafter a user can choose the most economical way of payment, if a merchant accepts payments in more than one form of electronic money.

23 Claims, 7 Drawing Sheets

METHOD AND SYSTEM FOR PERFORMING ELECTRONIC MONEY TRANSACTIONS

BACKGROUND OF THE INVENTION

The present invention relates to electronic monetary systems in general, and in particular to measures for making their use easier for an average user.

A conventional Internet Service Provider (ISP) system is shown in FIG. 1. The basic duty of an ISP is to transfer data from one network such as the Internet to another network such as the conventional telephone network, and vice versa. A user can connect to the Internet network 116 using his computer 100 and modem 102 via the conventional telephone network, represented in FIG. 1 by the user's local telephone exchange 104, and via the ISP system 105. A conventional ISP system 105 comprises a Call Control Point 106, which receives the calls and directs them to terminal servers 112. The terminal servers 112 basically convert the data signals from the form used in the conventional telephone network to the form used in the network 116 to which the ISP system 105 is connected to, and vice versa. A typical ISP system 105 further comprises a router 114, which receives the data signals from terminal servers 112 and sends them to the network 116, and conversely, receives data signals from the network 116, and based on the destination addresses given in the data signals, forwards each signal to the correct terminal server 112. A typical ISP system 105 also comprises a proxy 118, which functions as an intermediary between the users of the ISP and third parties in the network 116. A proxy typically caches in its mass memory most recent documents, which the users of the ISP retrieve from the network. If a user transmits a request for a document which had recently been accessed from the ISP and is therefore cached in the memory of the proxy, the proxy sends the user a copy of the document from its memory, in order to reduce the load on the network 116 and speed up the service perceived by the user.

The data signals are transferred in the Internet with TCP/IP protocol, which is described in detail in the standards RFC 791 and RFC 793. World Wide Web (WWW) documents can be accessed on WWW servers in the Internet with the help of the HTTP protocol, which defines among others, a standard format for requesting a certain document on a given WWW server. Version 1.0 of the HTTP protocol is defined in the standard RFC 1945. The TCP/IP protocol and the HTTP protocol are both well known to the man skilled in the art, and do not require further elaboration.

FIG. 2 shows the configuration of a second type of telephone network service, namely a voice service provider system 210 used for example in automated ordering services. FIG. 2 shows an example, how an Intelligent Network (IN) compliant telephone exchange can be used to produce an automated service. The voice service system 210 comprises an IN-compliant Service Switching Point (SSP) 104, a Service Control Point (SCP) 110 which controls the SSP, and a database with voice output 212. The duty of the SSP is basically to connect the callers to the outputs of the database 212. The user can, for example, order tickets from such a service by pressing the number keys on his telephone, while the SCP guides the user with the help of the messages in the database 212. Intelligent Network features and the capabilities of various IN components, such as the CCP, SCP and SSP are described in several CCITT recommendations, for example the recommendations Q.1201, Q.1202, Q.1203, Q.1204, Q.1205, Q.1211, Q.1213, Q.1214, Q.1215, and Q.1218.

Several versions of electronic money are available or under development today. An overview of major versions of electronic money is given in the cover story and related articles in the June 1996 issue of the Byte magazine. In one system, a user can obtain electronic cash from a provider of electronic cash, which gives the user electronic symbols representing the amount of money paid by the user. The user typically stores these symbols in his computer with the help of a electronic wallet program, and uses the symbols later for payment of various services or merchandise over a telecommunications network, such as the Internet. After the transaction, the merchant can send the received symbols to the provider of electronic cash and change them to real money. Such an electronic monetary system is described in detail in, for example, the European patent application EP 542 298 and the references contained therein. An electronic monetary system based on the use of credit cards or like means of payment is currently being developed by major credit card companies. One similar credit card based system is described in the standard RFC 1898.

Common to all current electronic monetary systems is that they are cumbersome from the user's point of the view. The user must first obtain the electronic money before being able to pay for services or merchandise over a communications network such as the Internet. Further, the user typically needs a special electronic wallet program. In one major credit card based electronic monetary system, the user must obtain an electronic identification certificate identifying him as the rightful owner and user of his credit card.

These requirements cause a burden on the user, and requires the average user to know about the details of various forms of electronic money and learn how to obtain and use such electronic money. The symbols representing the electronic money are typically stored on the hard disk of the user's computer, and are vulnerable to accidental erasure or malfunction of the hard disk. Therefore, the user should take good care of the electronic cash, and take backup copies of the symbols representing the money. Although electronic monetary systems provide for replacement of accidentally lost electronic money, the replacement procedure is a burden on the user. Further, since there are more than one type of electronic money being developed, the user needs to obtain all major types of electronic money if he desires not to be limited in his buying choices, since it is very probable that all merchants will not accept all forms of electronic money.

SUMMARY OF THE INVENTION

An object of the invention is to make it easy for a user to pay with electronic money. A further object of the invention is to allow a user to pay with electronic money without requiring him to obtain any electronic money himself. A still further object of the invention is to implement a system, with which Internet Service Providers and like services can provide an easy way of using electronic money for their users.

These aims will be reached by adding an intercepting means and electronic wallet means to an ISP system, and arranging the system to

- optionally initiate the payment procedure on the request of the user,
- intercept and redirect to the electronic wallet means an incoming payment request addressed to a user,
- add a charge corresponding to the requested amount to the user's telephone bill, and
- send from the electronic wallet means an electronic money payment in response to the payment request from a merchant.

The system according to the invention is characterized by that the system comprises an electronic payment intercepting means, which is arranged to redirect at least a part of electronic money transaction messages arriving from the first telecommunications network and addressed to users in the second telecommunications network to an electronic wallet means, which electronic wallet means is arranged to convert electronic money transaction messages into conventional transactions.

The method according to the invention is characterized by that the method comprises the steps of receiving a electronic money transaction request from a first telecommunications network addressed to a user in a second telecommunications network, transforming the electronic transaction request to a conventional transaction.

The present invention is based on the idea, that the use of electronic money is greatly simplified for a non-expert user, if the ISP takes care of the electronic money payments, and adds corresponding charges on the user's telephone bill or uses some other suitable way of obtaining a payment from the user. Such functionality requires the intervention of the ISP in the transmissions between a user and a third party, i.e. intercepting the electronic payment requests sent by a merchant. According to a preferable embodiment of the present invention, the ISP uses electronic money on behalf of the user, and charges the payments on the user's telephone bill. The ISP can take care of all technical details necessary for obtaining different forms of electronic money in a centralized manner, and all users of the ISP can use the electronic money obtained by the ISP simply by allowing the ISP to add corresponding charges to their telephone bills. Further, the ISP can obtain all major forms of electronic money, whereafter a user can choose the most economical way of payment, if a merchant accepts payments in more than one form of electronic money.

The system according to the present invention comprises an interception means, which examines the incoming data traffic. When the interception means notices that a transmission contains a request for payment with electronic money, it redirects the transmission to another means comprising the functionality necessary for the use of electronic money. After this, the system inspects the request, adds a corresponding amount to the user's telephone bill and continues with the payment according to the received request. The system according to the invention can further comprise means for controlling, and optionally initiating, the payments. For example, the user can set up an acceptance policy or accept or reject individual payments through a separate connection to a network address administered by the system according to the invention.

BRIEF DESCRIPTION OF THE DRAWINGS

Various embodiments of the invention will be described in detail below, by way of example only, with reference to the accompanying drawings, of which

FIGS. 1 and 2 were described earlier in connection with the description of the state of the art.

DESCRIPTION OF THE PREFERRED EMBODIMENTS

Figure 1:
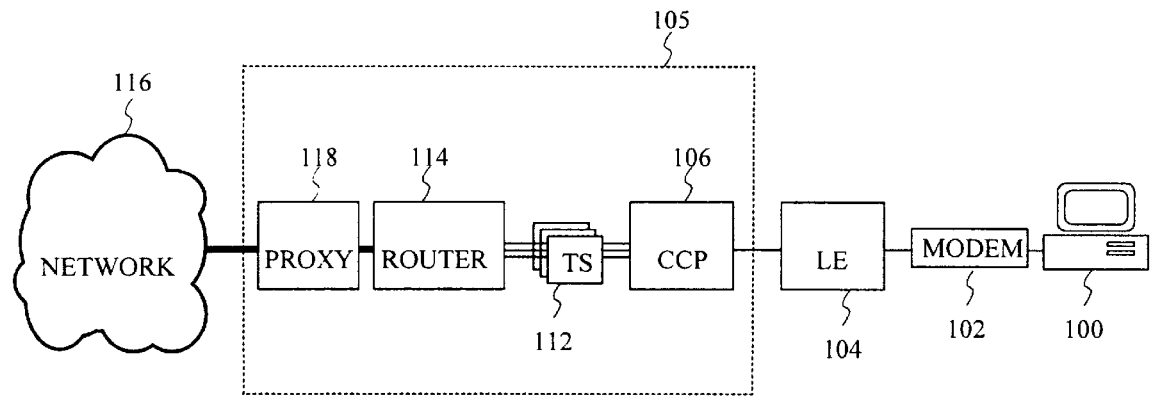
FIG. 1 shows, how a user can connect to a network such as the Internet according to the prior art.
Figure 2:
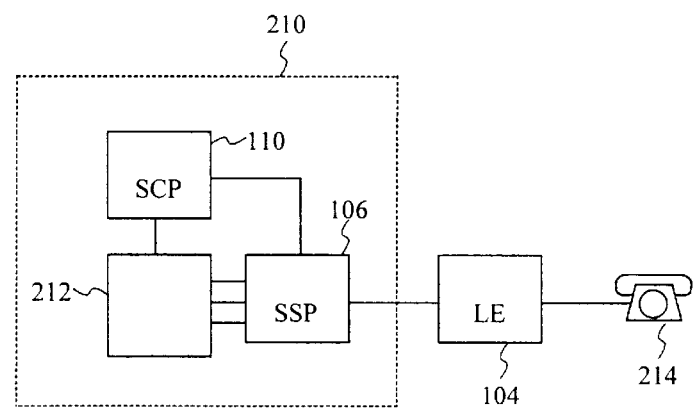
FIG. 2 shows an example of a voice service provider system using an IN-compliant telephone exchange.
Figure 3:
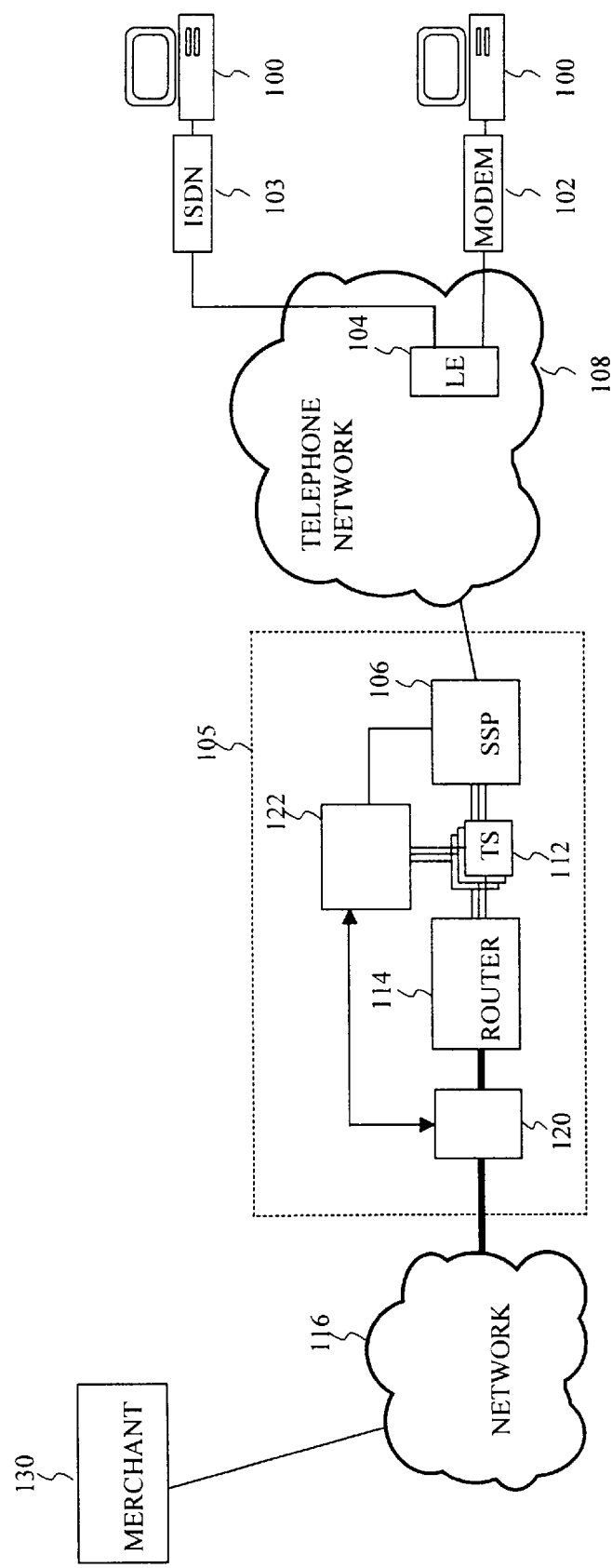
FIG. 3 shows a basic example of a system according to the invention.

FIG. 3 shows a basic example of an advantageous embodiment of the invention. In this example, the user is in contact with a merchant 130 with his computer 100 and conventional modem 102 or ISDN adapter 103, through the conventional telephone network 108, local telephone exchange 104 of the conventional telephone network, the system 105 of the Internet service provider (ISP), and the network 116. The conventional telephone network may support ISDN connections as described here, for example, by having a telephone exchange 104 supporting ISDN connections. Any other known connecting methods and techniques may as well be used, for example, such as ADSL or HDSL connections. In the system according to the invention, the ISP system 105 additionally comprises an intercepting means 120. The intercepting means 120 redirects the payment requests originating from the network to the control unit 122 of the ISP system 105. When the user gives a request for a service or a merchandise, the merchant's 130 system responds with a payment request. The intercepting means 120 redirects the request to the control unit 122, which sends conventional accounting signals corresponding to the payment via the SSP 106 to the user's local telephone exchange 104, where the corresponding sum is added to the user's telephone bill. After sending the accounting signals, the control unit 122 sends the electronic money to the merchant 130 via the network 116. After receiving the electronic money, the merchant 130 continues with producing the requested service or merchandise.

The control unit may send the electronic money and other messages to the merchant via the intercepting means 120 as in the embodiment of FIG. 3, or past the intercepting means, for example via a router included in the ISP system.

The control unit may effect the debiting of the user's telephone account at any convenient stage in the payment procedure, not only in the beginning of the procedure. Naturally, it may be desirable for the ISP to effect the debiting at the latest before a point in the payment procedure after which the payment cannot be cancelled, if the debiting for some reason is not succesful.

In one advantageous embodiment of the invention, the control unit 122 comprises in addition to the functionality needed for the use of electronic money, also the functionality of a conventional IN-compliant Service Control Point.

In the embodiment of FIG. 3, the electronic wallet means, i.e. the electronic money transaction means, is located in the control unit 122 or a similar functional entity. The wallet and its contents are taken care of by the ISP, which obtains more electronic money from a electronic money provider when necessary. The ISP can obtain all major forms of electronic money from major electronic money providers, whereafter the user does not need to take notice of which merchants require which kind of electronic money.

Figure 4:
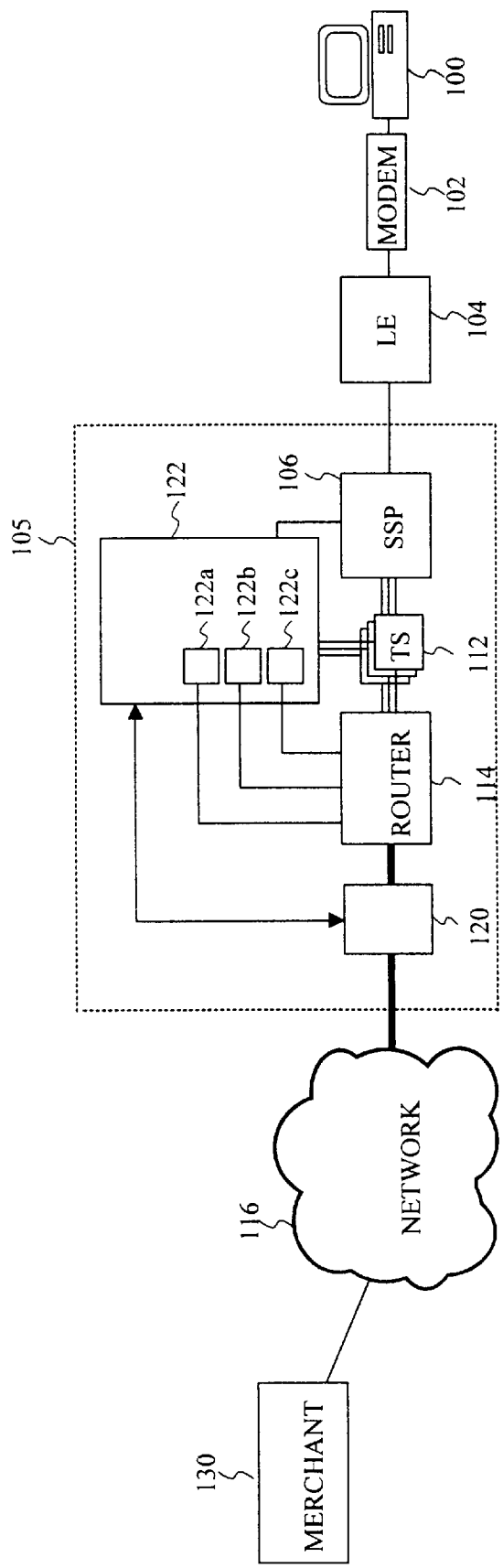
FIG. 4 shows another example of a system according to the invention.

One important aspect of electronic money is the possibility for the user to accept or reject any given payment request. In the system according to invention, this can be implemented in several ways. One advantageous embodiment is shown in FIG. 4. The control unit 122 is connected to the router 114, and the user can form a connection to a payment control means 122a in the control unit 122. This payment control means 122a can be, for example, in the form of a World Wide Web (WWW) document at a certain network address, which is administered by the control unit 122. The router 114 directs all communication from the user to this network address directly to the control unit. The user can open a connection to the network address of said payment control means in the same conventional way as to any other address in the network 116. The control unit 122 can recognize the user connecting to it via the network 116 based on the user's network address, since the control unit 122 knows the network addresses allocated for the users of the ISP system 105. Once the user has opened a connection to the said network address of the control unit 122, the control unit 122 can inform the user via the opened connection of an eventual incoming payment request and ask for confirmation.

The payment control means and other control means described later in this application could be directly connected to the network 116. In that case, communication from the user to the control means would pass through at least a part of the network 116. However, such a configuration would be more vulnerable to outside attacks, since the important information determining the acceptance of payments would briefly flow outside the ISP system. The configuration shown in FIG. 4 is more secure, since the communication between the user and the control means only takes place within the conventional telephone network and within the ISP system.

As in the case of conventional electronic money, the user can adopt a default policy towards payment requests and instruct the ISP to treat incoming payment requests accordingly. The policy can include, for example, the options of allowing payments under a certain limit, allowing all payments until a certain cumulative amount has been reached in a given time period, allowing all payments to a given merchant or a number of merchants, forbidding all payments to a given merchant or a number of merchants, any combinations of the previous, or forbidding all payments.

The user can set up the policy with the ISP in many ways, for example, by making a separate agreement with the ISP. The ISP can as well set up a default policy, which the users agree on when starting to use the services of the ISP. In one advantageous embodiment of the invention, the control unit 122 comprises policy control means 122b, and the user can control and adjust the payment acceptancy policy by connecting to the control unit 122 through the network as described above, and instructing the control unit 122 with the help of the said policy control means 122b. The control unit 122 can find out which user's policy information to change by recognizing the user in the way described previously.

A further aspect of electronic money, namely the voluntary sending of an amount of electronic money, can be implemented in a similar way. In one advantageous embodiment of the invention, the control unit 122 comprises payment sending means 122c, which the user can connect to at a certain network address as described previously. After connecting to the said payment sending means 122c, the user can instruct the payment sending means 122c to send an electronic payment to a desired network address. After receiving the instruction to send a payment, the payment sending means preferably first sends accounting signals to the user's exchange 104 to add the amount to be sent to the user's telephone bill, after which the payment sending means 122c sends the instructed amount of electronic money to the desired address, indicating the user as the sender of the money. It is also possible that a user wishes to send an anonymous donation. Therefore, the payment sending means 122c preferably also comprises a control means allowing the user to instruct the payment sending means 122c not to designate him nor any other person as the sender of the payment. The user may also use any of the known methods of hiding the identity of the sender of a message, for example by sending the payment via a special anonymous server.

In some electronic money systems the user may need to initiate a payment procedure himself. In the system according to the invention the user can initiate the payment for example with the payment sending means 122c or other similar control means.

In one advantageous embodiment of the invention, the payment control means 122a, policy control means 122b, payment sending means 122c, and any other control means described in this application are combined into one general control means, in order to allow the user to control all aspects of the electronic money with a single connection. Also any combinations of the control unit 122 and any control means described in this application are possible to implement.

In a further advantageous embodiment of the invention, the system according to the invention provides for a further aspect of electronic monetary systems, namely receiving payments. In this embodiment, the system according to the invention receives and processes the payment in the way specified by the electronic monetary system in question. After receiving the payment, the system transfers a corresponding amount of credit to the user. The transferring may proceed, for example, in one of the following ways:

if the base network through which the user is connected to the ISP allows crediting the user's account, the system can credit that account;

the ISP can keep internal accounts for the users, in which case the payment is added to the account; or the ISP can initiate an automatic bank transfer to the bank account of the user, if the user has informed the ISP of his bank and his bank account. Alternatively, the system according to the invention can employ any of the prior art methods of crediting an account, used for example in conjunction with various service lines charging an extra fee above the normal call fee. Preferably, the system according to the invention can be instructed by a user to collect payments into an internal account until a specified minimum amount has been reached, before transferring the accumulated credit to the user.

The control unit 122 can include details about each payment in the accounting information sent to the user's telephone exchange 104 to allow detailed itemization of paid goods and services on the user's telephone bill, if the base network containing the telephone exchange 104 supports detailed itemization of the telephone bill. This kind of reporting may also be accomplished through sending a separate information letter or e-mail to the user or using any other known means of informing a user.

The requested payments might not be exact multiples of the charging unit of the telephone network, through which the user is connected to the ISP system 105. The requested payments may even be substantially smaller than conventional charging units, since many electronic monetary systems provide for very small payments called micropayments. The system according to the invention may comprise means for keeping accounts for sums below one charging unit, and wait until the total of payments exceeds one charging unit, before sending accounting signals to the user's local exchange for adding one charging unit to the user's telephone bill. The invention does not limit the charging practices of the ISP system in any way. The ISP can for example add a surcharge for every electronic payment made using the system according to the invention.

In one advantageous embodiment of the invention, the ISP sends the user a separate invoice, instead of charging his telephone account. The ISP may collect a number of payments into an internal account, until a first predetermined sum has been reached, after which the ISP sends an invoice. If a payment is larger than a second predetermined sum, the ISP can send an invoice covering that particular payment. The ISP may as well require the user to deposit an amount before allowing the user to use the electronic money of the ISP, i.e. require payment before use. Naturally, any conventional invoicing methods may be used.

The system according to invention can use any electronic monetary system, even credit card based monetary systems. The system can pay the merchant with the credit cards issued to the ISP, after adding the corresponding sum to the user's telephone bill. The ISP can obtain all necessary electronic identification certificates and programs necessary for using a given type of credit card based electronic money, thus alleviating the burden from the users of the ISP.

The basic functions performed by the intercepting means 120 include, but are not limited to, the following:

the intercepting means 120 inspects every incoming data packet, if the data packet does not contain electronic money traffic, the data packet is forwarded in the normal way to the user, if the data packet does contain electronic money traffic, the intercepting means 120 directs it to the electronic money transaction means.

The method of detecting electronic money traffic from other traffic may vary depending on the actual protocol used to transfer money. In the current electronic monetary systems the two main approaches for the transmission of electronic money information are the following:

1) the electronic money traffic is directed to a certain port according to the TCP/IP-protocol, 2) the electronic money information is contained within special fields of the HTTP protocol. Preferably, the system according to the invention is arranged to handle both types of electronic money information. For clarity, the cases 1) and 2) are discussed separately in the following paragraphs.

In the case that the electronic money traffic is directed to a certain TCP port, the basic function of the intercepting means 120 of redirecting electronic money traffic to the control unit 122 can be implemented in several ways, which include at least the following:

1a) The intercepting means 120 can redirect the electronic money containing packets to a different output than the rest of the traffic, as shown in FIG. 4.

1b) The intercepting means 120 can treat a packet containing electronic money as a piece of data and pack it into one or more IP packets addressed to the control unit 122 and forward the new packets to the same output as the rest of the traffic, after which the router 114 of the ISP system 105 switches the new packets to the control unit 122.

1c) The intercepting means 120 can rewrite the packet, replacing the user's address with the address of the control unit 122 in the destination address field of the packet, and encoding the user's address in other fields of the packet or by adding a source routing option to allow the control unit 122 to recognize which user the packet was originally addressed to. After rewriting, the intercepting means 120 forwards the rewritten packet to the same output as the rest of the traffic, whereafter the router 114 of the ISP system 105 switches the new packets to the control unit 122.

Figure 5:
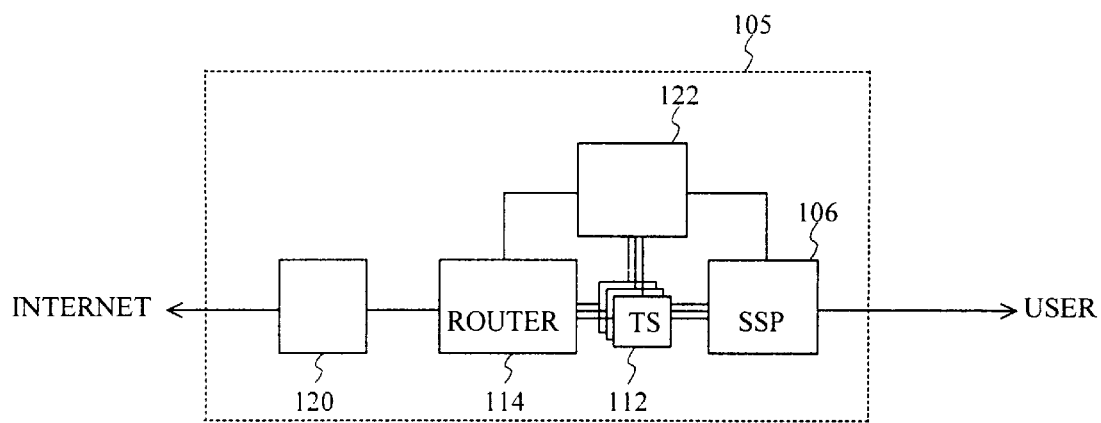
FIG. 5 shows an embodiment of the invention, in which the interception means 120 outputs the redirected traffic via the same output as the rest of the traffic.

The configuration of the embodiment shown in FIG. 5 is suitable for use with the said ways of implementation 1b) and 1c). In this embodiment, the intercepting means 120 effects the redirection of the packets by readdressing them to the control unit 122. The router 114 subsequently forwards all packets to their stated destination addresses, whereafter the redirected packets reach the control unit 122.

The exact TCP port dedicated for electronic money traffic may vary depending on the electronic money provider. In this case, the intercepting means 120 can check, if the TCP port number in the destination port field of the packet corresponds to any of the port numbers in a predetermined set of port numbers.

In one advantageous embodiment of the invention, the intercepting means 120 redirects the electronic money traffic addressed to only some users, and passes through the electronic money traffic addressed to other users without redirection. In this embodiment, if the data packet contains electronic money traffic, the intercepting means 120 determines the destination of the packet. If the packet destination is not one of the users in a certain category, the packet is passed normally to the end user. In this embodiment, the users of the ISP can take care of the electronic money themselves in the manner known in the art, if they do not wish to pay for any services or merchanise on the telephone bill. Such an option would be useful, for instance, for the employees of a small company, who are using the company's account at the ISP to access the network, and who wish to pay themselves for the services or merchandise. The intercepting means can also redirect payment requests of certain kinds of electronic money only, and pass payment requests of other kinds of electronic money without redirection. These features can be preferably controlled by a control means similar to previously described control means 122a, 122b, and 122c.

The case 2) above, i.e. when the electronic money information is contained within additional fields of a HTTP request according to the HTTP protocol, is slightly more complicated. A HTTP request may be sent over a network in one or more transmission units such as TCP packets, depending on the size of the request and the size of a single transmission unit of the network. Therefore, the HTTP request may need to be reconstructed from the sent transmission units, before the intercepting means 120 can inspect, whether the request contains electronic money information or not.

The HTTP protocol allows for transmission various data fields before payload data in a single transmission such as a HTTP request. The HTTP protocol itself defines and uses some fields, and electronic monetary systems may define other fields.

The electronic monetary systems may use at least the following formats in a single HTTP transmission:

2a) the transmission only contains the electronic money information in one or more fields, 2b) the transmission contains the electronic money information in one or more fields and as the payload data of the transmission, or 2b) the transmission contains the electronic money information in one or more fields, and a document.

In the cases 2a) and 2b) above, the transmission only contains electronic money information in various forms. In these cases, the intercepting means 120 redirects the transmission to the control unit 122, which can subsequently act as required by the electronic payment protocol in question and as described above in connection with the description of FIG. 3.

The case 2c) above is more complicated. As above, the intercepting means 120 redirects the transmission to the control unit 122. In this case the control unit 122 must decide, whether the user needs to receive the document contained as the payload data of the transmission. If the control unit 122 is able to determine that the user does not need to receive the document, the system can act as described above at points 2a) and 2b). This determination is possible, if the electronic payment protocol in question has standardized the content of such a document, and the control unit 122 can verify that the document does not contain any new information for the user. For example, it may be a HTML document of a predetermined structure, containing a question about acceptance of the purchase and the definitions of a "Yes" and a "Cancel" button for the user to approve or to cancel the purchase. If the purchase is within the limits indicated by the user for automatic acceptance, the control unit 122 does not need to present the question to the user.

If the control unit 122 is unable to determine that the user does not need to receive the document, it must pass the HTTP request containing the document to the user. The control unit can accomplish this for example by sending the HTTP request back to the intercepting means 120, instructing the intercepting means 120 to send the HTTP request to the user. Alternatively, the system may comprise another means for adding such requests sent by the control unit to the data communication traffic directed to the user. In order not to invoke a payment procedure at the user's computer, the control unit 122 preferably removes the fields containing electronic money information from their contents t forwarded to the user or replaces them or their contents with an indication to the effect that the payment is already being taken care of.

In a further advantageous embodiment of the invention, the system according to the invention can prompt the user for the acceptance or denial of a payment by sending the user an electronic document, such as a HTML document, containing for example a question about acceptance of the purchase and the definitions of a "Yes" and a "Cancel" button for the user to approve or to cancel the purchase. Specifically, in the case 2c) described above, the control unit can replace the document sent by the merchant with a similar document specific of the ISP system before forwarding the HTTP request to the user. Of course, as described above, the control unit needs to determine first, if it is allowed to replace the original document.

The HTTP 1.0 protocol is defined in the standard RFC 1945 and is well known by the man skilled in the art. Therefore, the protocol is not described in this application. The exact fields and field names utilized by various electronic monetary systems may vary according to monetary system and electronic money provider in question, wherefore the exact fields and field names are not defined in this application. The system according to the invention can be arranged to act upon any given protocol for transmission of electronic payments.

In a further advantageous embodiment of the invention, the intercepting means 120 redirects all HTTP traffic on the basis of the TCP port number reserved for the HTTP protocol. The system according to the invention can employ a two-level intercepting means scheme, in which the redirected HTTP traffic is interpreted and inspected by a second-level intercepting means, which directs HTTP transmissions containing electronic money information to the control unit 122, and forwards the rest of the HTTP traffic to the user. Alternatively, the first intercepting means 120 can redirect all HTTP traffic directly to the control unit 122, which then interprets and inspects all HTTP transmissions. As previously, if any given HTTP transmission does not contain electronic money information, the transmission is forwarded to the user. If a HTTP transmission contains electronic money information, the transmission can be handled as described previously.

Figure 7:
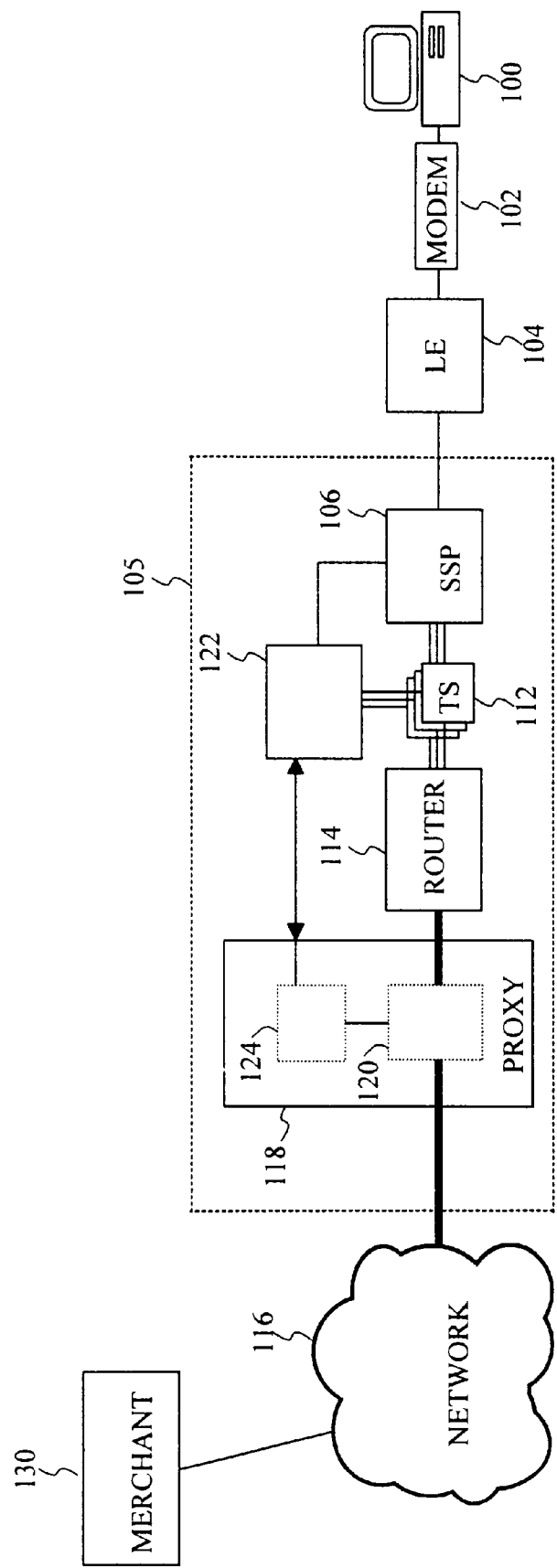
FIG. 7 shows an advantageous embodiment of the invention, where the interception means 120 is implemented within a proxy 118.

In a further advantageous embodiment shown in FIG. 7, the intercepting means 120 and preferably also the functionality of the control unit 122 pertaining to electronic money are implemented in the proxy 118 of the ISP system. For example, the electronic wallet means 124 of the ISP system could be implemented in the proxy 118 instead of the control unit 122, as described previously. Also, the control means 122*a*, 122*b* and 122*c* and other control means pertaining to use of electronic money can be controlled by the proxy 118, in the embodiment of FIG. 7. In this embodiment, the remaining functionality of the control unit 122 is very close to that of a conventional Service Control Point 110 of an IN-compliant telephone exchange. The proxy 118 can handle all details of the electronic money transactions, and the control unit 122 in addition to the conventional functions of a Service Control Point, only needs to be able to receive accounting information from the proxy 118 and return a confirmation of a succesful addition of a sum on the user's telephone bill.

In conventional ISP systems, the use of the system's proxy is not mandatory for a user, and he can configure the programs in his computer not to use the proxy. In the embodiment of FIG. 7, the user can control the usage of electronic money also by choosing whether to use the proxy 118 or not. Further, a large ISP may have more than one proxy to handle the traffic; in that case, the user may choose which proxy to use: one with electronic money functionality, or a conventional one without functionality supporting the use of electronic money. In the embodiment of FIG. 7, if the user does not use a proxy or uses a conventional proxy, the ISP does not treat the electronic money traffic for that user in any special way, whereafter the user may use his own electronic money if he so wishes.

The intercepting means 120 can also be implemented, for example, in a firewall device. A firewall device is typically a computer running screening software, installed between a system and a network to protect the system from unwanted intruders from the network. One typical way of operation for a firewall device is to readdress all traffic originating from users of the system and all incoming traffic addressed to users in the system, in order not to reveal the true network addresses of the users. That is, in outgoing traffic the firewall replaces the user's address with a bogus address and stores the user's address and the bogus address in its memory. Conversely, the firewall device replaces the bogus address given as the destination address in an incoming message with the real address of the user. The firewall usually blocks all incoming traffic addressed to any other addresses. Such a readdressing means provides an advantageous starting point for implementation of an intercepting means, which effects the separation of electronic money traffic from the rest of the traffic by readdressing the electronic money traffic as described previously.

The inclusion of the electronic money functions in the control unit 122 in some of the previously described embodiments of the invention was presented as an example only. The separation of the electronic money functions from the control unit 122 to a separate means such as a proxy 118 as in the previous example, or a separate electronic money unit can be incorporated in any of the embodiments described in this application.

In a further advantageous embodiment, the system according to the invention can convert one form of electronic money to other forms of electronic money. For example, the user may have only one type of electronic money, in which case it is desirable that the ISP system would convert requests for payment into requests of that type of electronic money, with which the user can pay. In such an embodiment, the system according to the invention sends the user a conventional payment request, instead of sending accounting information to the conventional telephone network to charge his telephone bill. After receiving the payment from the user, the ISP system can respond to the original payment request in whatever type of electronic money requested.

The system according to the invention can further be used to make it easier to obtain electronic money. If a user wishes to obtain electronic money to be able to make electronic payments independently of the ISP, he can contact a bank which has made a special agreement with the ISP allowing the ISP's users to download electronic money into their own computers from the bank and to pay for the downloaded money along with their telephone bill. Alternatively, since a bank can act as a conventional merchant as well, the user can contact a bank which sells electronic money, i.e. changes one type of electronic money to other types of electronic money for a commission. This way, a user can obtain electronic money into his computer, which he can then use in other systems without the help of the ISP. For example, the user can download the electronic money from his computer into a smart card, and pay with the smart card for purchases in conventional shops, for tickets on the city transport etc.

In the previous embodiments, the network 116 can be, but is not limited to, the Internet. The network 116 may be any other network, for example a closed network of a certain business sector, closed in the sense that it is only accessible to companies, not individual persons.

Figure 6:
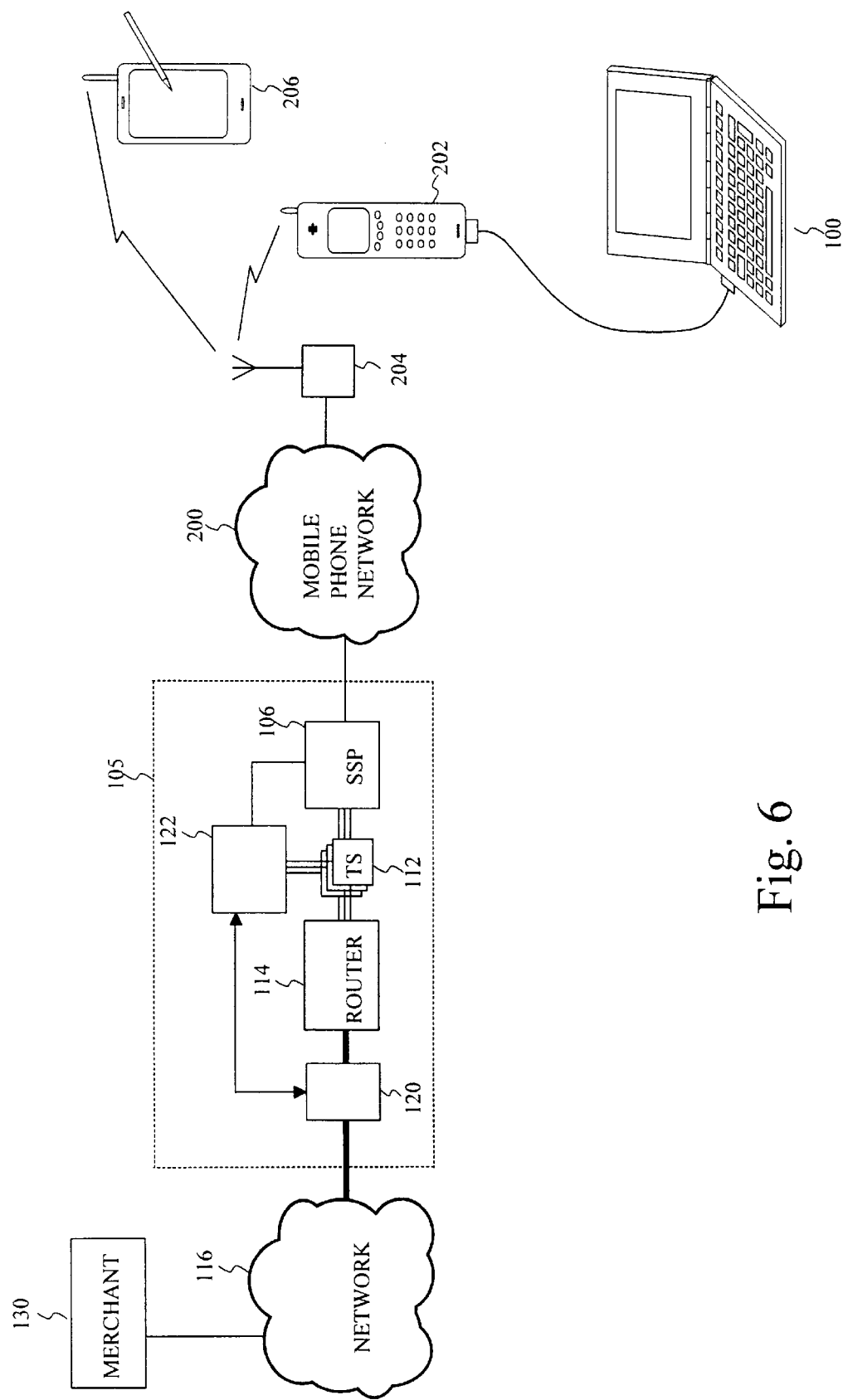
FIG. 6 shows an example, where the system according to the invention is implemented in a system connected to a mobile telephone network.

In the previous embodiments, the user was connected to the ISP system 105 via a conventional PSTN/ISDN (Public Switched Telephone Network/Integrated Services Digital Network) telephone network. However, the system according to the invention can be used in conjunction with other types of telecommunications networks as well. In one advantageous embodiment of the invention, the user is connected to the ISP system 105 via a mobile telecommunications network 200, as shown in FIG. 6. For example, the user can contact the ISP system 105 with his laptop computer 100 and mobile telephone 202, via the base station 204 of the mobile telecommunications network 200. The mobile telecommunications network 200 can be for example a GSM (Global System for Mobile communications) or a DAMPS (Digital Advanced Mobile Phone Service) network.

Alternatively, the user can use a PDA device 206 (Personal Digital Assistant) comprising mobile terminal functions, or a similar device to connect to the ISP via the mobile network 200. The embodiment shown in FIG. 6 is very advantageous for those mobile telephone service providers which also sell ISP services. Other possible telecommunication networks are cable television networks, where several suggestions have been made which would convert the cable TV network from a one-way broadcasting network into a two-way telecommunications network.

The previous embodiments describe several functional entities, such as the intercepting means 120, the control unit 122, and the electronic wallet means 124. These functional entities can be implemented in many different ways in one or more physical pieces of equipment, and the invention does not limit the form of implementation of these entities. For example, the intercepting means 120 can be implemented in the router 114, or a plurality of intercepting means 120 can be implemented in the terminal servers 112. The intercepting means 120 and the control unit 122 can even be implemented in the same physical device. Further, if desired, the control unit 122 can be implemented with several sub-units in one or more physically separate devices. For example, the functionality of the control unit 122 can be implemented as computer programs functioning in one or more computers.

In the following paragraphs, a description of one exemplary embodiment of the invention is presented with reference to FIG. 8.

In this embodiment, the intercepting means 120 is implemented in a fast microcomputer running the NetBSD operating system. The microcomputer is equipped with local area network (LAN) interfaces for connection to the Internet, to the terminal servers 112 and to the control unit 112. The TCP level intercepting means is implemented by changing the operating system kernel routines handling IP packets. Namely, the ip_input() operating system function is modified to inspect all incoming TCP/IP packets. Those packets that include electronic money information, i.e. designate a port number reserved for an electronic monetary system, are redirected to the control unit 122 via the LAN interface. Packets containing HTTP traffic are directed to HTTP screening software 120' running in the same microcomputer.

The HTTP screening and intercepting software 120', which was in the description of one of the previous embodiments referenced to as a second-level intercepting means, receives all packets containing HTTP traffic from the modified operating system kernel. The HTTP screening and intercepting software 120' inspects the packets to determine, whether the packets contain electronic money information. If this cannot be determined from a single packet in the case of a HTTP transmission consisting of more than one packet, the HTTP screening and intercepting software 120' can collect several packets before making the determination. If a HTTP transmission does not contain electronic money information, the transmission is forwarded to the terminal server 112. HTTP transmissions containing electronic money information are forwarded to the control unit 122.

The microcomputer is also equipped with router software to route the non-redirected traffic to the terminal servers and traffic originating from the user to the Internet and to the control means implemented by the transaction authorization means 122e.

Figure 8:
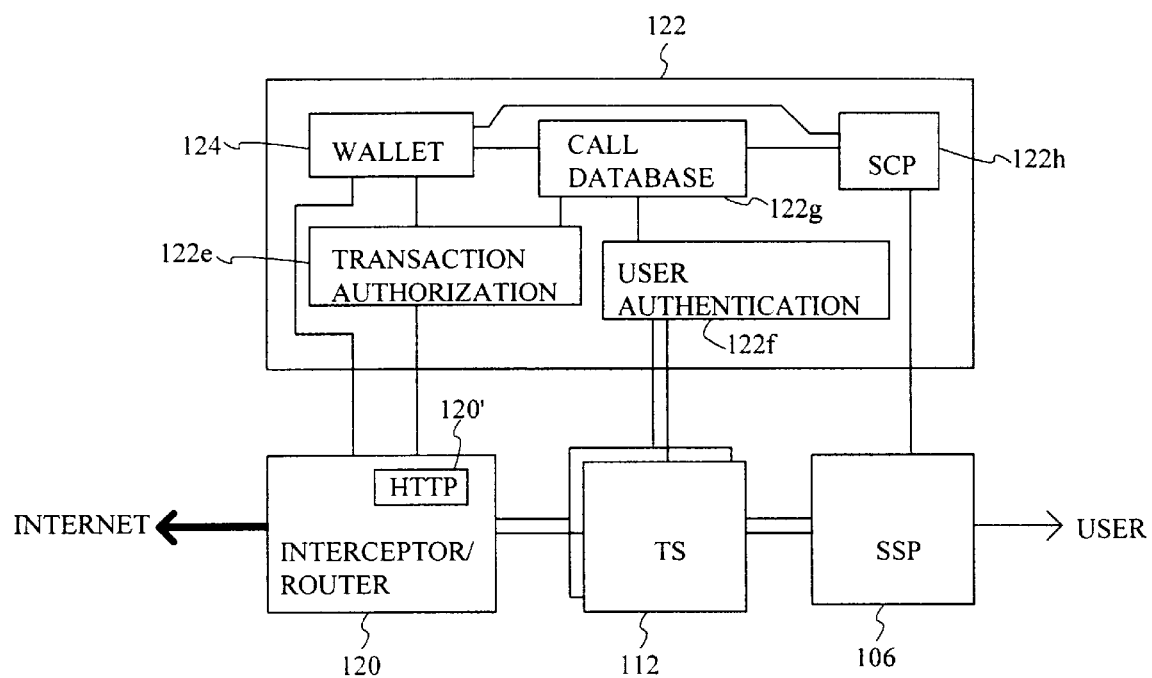
FIG. 8 shows an example of a particular implementation of the system according to the invention.

In the embodiment of FIG. 8, the control unit 122 comprises a Unix server, such as a HP 700 series workstation. The workstation runs the electronic wallet software 124, transaction authorization software 122e, SCP software 122h, user authentication software 122f and call database software 122g.

The electronic wallet software 124 comprises functions enabling the software to act as a client, i.e. buyer, in electronic money transactions. The wallet software preferably comprises specialized functions for handling different forms of electronic money, such as the E-cash and the credit card based SET protocol. The electronic wallet software handles the electronic money transaction messages received from the intercepting means 120, 120' and queries the transaction authorization software for acceptance or denial of a transaction. After receiving an authorization, the electronic wallet software obtains the telephone call identifier from the call database software on the basis of the user's IP address specified in the transaction message. After receiving the call identifier, the electronic money software instructs the SCP software to debit an amount of money on the user's telephone account. The amount to be debited is based on the electronic money transaction request, possibly including service commissions of the ISP, sales taxes and other fees. If the exact amount cannot be charged due to fixed size of charging units within the telephone network, the excess charge can be stored in the call database as temporary user credit, or be refunded by adjusting the basic charging interval within the telephone network. When the electronic wallet software receives from the SCP software an indication that the amount requested has been charged, it continues the electronic money transaction. The electronic wallet software includes the user's IP address information in such a way in the transmission sent as a reply to the merchant, that the user is identified as the sender of the transmission.

The electronic wallet software 124 preferably holds a sufficiently large sum of electronic money, and all necessary certificates and credit and debit card numbers necessary for using credit card based electronic monetary systems.

Transaction authorization software 122e determines, whether a given transaction is authorized or not. The transaction authorization software comprises the functions necessary for implementing the authorization policy options described previously in connection with description of FIG. 3.

Preferably, the authorization software 122e also implements the payment control means 122a and policy control means 122b described previously. For that purpose, the authorization software administers one or more WWW documents, in the form of HTML forms using CGI scripts. The users can access these documents at a special network address, where the users can connect to in the same way as they would to any network address. The combined intercepting means and router 120 routes HTTP requests addressed to that address and originated by the users of the ISP to the authorization software. If a user has opened a connection to the special network address and obtained the payment control form, the authorization software can inform the user of a new payment request by sending the user an update of the form. The authorization software can recognize and certify that the intended user confirms the right payment request or that a user changes his own payment policy options, by checking the sender's IP address in the HTTP transmission sent by the user.

The SCP software 122h comprises the functions needed for an IN-compliant Service Control Point. One example of such software is the OSN SCP software of Systems Software Partners Ltd., Lappeenranta, Finland. For the embodiment of FIG. 8, software providing a standard SCP functionality needs to be augmented with functions implementing the ability to communicate with the electronic wallet software 124.

Whenever a new connection is opened through the SSP 106, the SCP software 122h stores information about the call to the call database 122g. This information can comprise a call identifier for future accounting functions and a line identification, that allows the user authentication software 122f to assign an IP number for that particular call. When a connection is closed, the SCP software 122h removes the information about the call from the call database 122g.

The accounting function of the SCP software 122h is initiated by the electronic wallet software 124. When the SCP software 122h receives an accounting request from the electronic wallet software 124 indicating the amount of money to be charged and the call identifier, the SCP software 122h converts the amount into charging units of the telephone network, and instructs the SSP 106 to perform the actual charging. After the SSP indicates that the charging is completed, the SCP sends an accounting reply to the electronic wallet software 124, indicating that the accounting function has been performed.

The user authentication software 122f assigns an IP number for each incoming call, and stores this number along with line information into the call database. Whenever the terminal server 112 receives a new incoming call, it sends an authentication request to the user authentication software 112f. This authentication request includes a line identifier, allowing the user authentication software 112f to assign an unique IP number to that line. The IP number is sent to the terminal server as a reply to the authentication request. The user authentication software 112f may also authenticate the users, i.e. confirm whether a new call is made by a registered user of the ISP or not.

In this embodiment, the call database software 122g maintains a database of at least the following information:
- telephone account identifier or a call identifier required to perform telephone network billing,
- line identifier that identifies the terminal server used by the call as well as the logical line number within the terminal server, and
- the IP address assigned for the call. Several suitable database software packages are available to and known by the man skilled in the art.

The terminal servers of the embodiment in FIG. 8 can be, for example, Ascend MAX TNT terminal servers from Ascend Communications Inc., US. These terminal servers can handle a large number of simultaneous calls and can support both conventional and ISDN telephone lines. Whenever a new phone call arrives from the SSP 106, the terminal server 112 queries the user authentication software 122f, which returns an IP number to be assigned for the call. The terminal server also gives the IP number to the user's computer through PPP protocol negotiations, after which the terminal server 112 starts to pass the user's TCP/IP traffic, until the call is terminated.

The SSP 106 in the embodiment of FIG. 8 can be a conventional IN-compliant Service Switching Point.

The networks specified in this application, such as the Internet and the conventional telephone network, are specified as examples only and do not limit the invention in any way. The invention can be used in any environment comprising a base network with an accounting function, and services or some forms of merchandise payable with electronic money.

In the previous embodiments, the ISP was given as an example of a suitable provider of the service enabled by the present invention. However, the invention is not limited to use by Internet Service Providers. For example, a company having an own telephone exchange may provide the system according to the invention for the benefit of its employees or its various units, without the company being an ISP per se.

Using the present invention, a user does not need to make separate agreements with electronic money providers, nor does the user need to obtain the electronic money before its use. The present invention alleviates the burden on the user by removing the need to learn how to obtain and use electronic money. A user does not need to obtain any special electronic money software in order to use electronic money. The user does not need any extra programs to use the invention, other than those needed to use the Internet or similar networks in the first place. The invention also removes the computational load placed on the user's computer by conventional electronic monetary system, since in the system according to the invention, computationally intensive operations of crypting electronic money information are performed in the computers of the ISP. The removal of the computational load is especially beneficial for the users of small PDA-type communication devices, whose computational capacity is often rather limited.

The present invention can be used with essentially all electronic monetary systems. An ISP can obtain all major forms of electronic money, whereafter the users of the ISP have several different forms of electronic money at their easy disposal, resulting in a greater freedom of choice in their merchant selections and purchase decisions. Also, users can then choose the most cost effective way of payment, since different fees charged by electronic money providers may vary according to the form of electronic money and the particular electronic money provider.

In this application, the term conventional transaction means any conventional way of effecting a monetary transaction, for example such as adding debit or credit on a user's telephone account, sending a separate invoice, transferring funds by bank transfer, or changing the balance on the user's internal account at the ISP for later invoicing or crediting.

I claim:

1. An electronic payment transaction system in a node joining a first telecommunications network and a second telecommunications network comprising
    an electronic wallet means for converting electronic money transaction messages into conventional transactions, and
    an electronic payment intercepting means for redirecting to said electronic wallet means at least a part of electronic money transaction messages arriving from the first telecommunications network and addressed to users in the second telecommunications network.

2. A system according to claim 1 comprising
    means for sending accounting signals to the second telecommunications network to change the balance of the user's account with a sum corresponding to a received electronic money payment request addressed to the user and for sending an electronic money payment into the first telecommunications network.

3. A system according to claim 2 comprising
    means for collecting more than one transaction of a user on an account internal to the system, before effecting a transaction between the system and the user.

4. A system according to claim 1 wherein the first telecommunications network is a TCP/IP network.

5. A system according to claim 4 wherein the first telecommunications network is the Internet network.

6. A system according to claim 1 wherein the second telecommunications network is a conventional PSTN telephone network.

7. A system according to claim 1 wherein the second telecommunications network has means for supporting ISDN connections.

8. A system according to claim 1 wherein the second telecommunications network is a cellular mobile telecommunications network.

9. A system according to claim 1 comprising transaction control means for allowing a user to confirm or decline transaction requests.

10. A system according to claim 1 comprising means for allowing a user to initiate an electronic payment transaction.

11. A method for performing electronic money transactions comprising the steps of
    receiving an electronic money transaction request from a first telecommunications network addressed to a user in a second telecommunications network,
    redirecting said request to an electronic wallet means instead of said user, and
    transforming in said electronic wallet means the electronic transaction request to corresponding accounting signals for changing the balance of an account corresponding to said user.

12. A method according to claim 11 further comprising the step of sending accounting signals to the second telecommunications network to change the balance of the account of the user with a sum corresponding to the requested transaction, as a response to the request.

13. A method according to claim 11 further comprising the step of sending an electronic payment into the first telecommunications network in response to a payment request.

14. A method according to claim 11 further comprising the step of checking, whether the user has authorized the transaction, and if the user has not authorized the transaction, sending a signal denying the transaction in response to the transaction request.

15. An electronic payment transaction system joining a first telecommunications network and a second telecommunications network, the system comprising an electronic payment intercepting means including:
    means for intercepting request for payment messages corresponding to electronic money in a first form, which messages arrive from the first telecommunications network and are addressed to a user in the second telecommunications network;
    means for converting said request for payment messages into messages corresponding to electronic money in a second form; and
    means for sending said converted request for payment messages to the user.

16. A system according to claim 15 wherein the first telecommunications network is a TCP/IP network.

17. A system according to claim 16 wherein the first telecommunications network is the Internet network.

18. A system according to claim 15 wherein the second telecommunications network is a conventional PSTN telephone network.

19. A system according to claim 15 wherein the second telecommunications network has means for supporting ISDN connections.

20. A system according to claim 15 further including transaction control means for allowing a user to confirm or decline a transaction request.

21. A system according to claim 20, wherein confirmation of a transaction request causes a debit in a user's account of electronic money in the second form, and said means for converting converts the debited amount into the first form of electronic money and, further including a transmission means for sending the amount of the first form of money to a requesting party in said first network.

22. A method for performing electronic money transactions comprising the steps of:

intercepting request for payment messages corresponding to electronic money in a first form, said messages arriving from the first telecommunications network and addressed to a user in the second telecommunications network;

converting said request for payment messages into messages corresponding to electronic money in a second form; and sending said converted request for payment messages to a user.

23. A method according to claim 22 further comprising the step of sending an electronic payment into the first telecommunications network in response to a payment request.

* * * * *